Patented Nov. 25, 1930

1,783,165

UNITED STATES PATENT OFFICE

HERMAN ALEXANDER BRUSON, OF PHILADELPHIA, PENNSYLVANIA, ASSIGNOR TO THE RESINOUS PRODUCTS & CHEMICAL COMPANY, A CORPORATION OF DELAWARE

MIXED ESTERS OF COLOPHONY AND RELATED SUBSTANCES

No Drawing.   Application filed October 8, 1928.  Serial No. 311,255.

It has been known in the past that acidic gums such as rosin (colophony) Congo gum, copal gums and the like, could be esterified with certain alcohols such as glycerol to yield esters which are known in the art as "ester gums". These products possess certain advantages over the original gums, in that they are harder and more water resistant. However, the ester gums which are at present used in the arts are all exceedingly brittle and can not be used in certain types of protective coatings where elasticity, flexibility, toughness and adhesion are desired.

I have discovered that when the esterification is carried out in the presence of certain acids, notably adipic acid, pimelic acid, suberic acid, azelaic acid, or sebacic acid, that mixed esters are obtained which are unusually tough and flexible. These esters maintain their flexibility even at $-5°$ C. and show much greater adhesion than do the simple esters. They are moreover completely compatible with nitro-cellulose and other cellulose esters in every proportion and can be used in lacquer solvents such as the mono-ethyl ether of ethylene glycol, in which other ester gums are incompatible with the cellulose derivative.

One method for preparing such mixed esters may be described as follows:

30 parts by weight of colophony are mixed with 15 parts of sebacic acid and 5 parts by weight of glycerol. The mixture is rapidly heated to 195–200° C. with stirring and kept at this temperature for about twenty minutes. The temperature is then increased to 250–260° C. and kept thereat for one hour until esterification is complete and a benzol-soluble ester results. The mixed ester thus obtained is tough and flexible, soluble in ethyl acetate, toluol, or butyl acetate. By increasing the proportion of colophony the mixed ester can be obtained with an increased degree of hardness.

The colophony may be replaced by other acidic gums such as Congo gum, Manila gums and the like, or condensation products of phenol and formaldehyde with colophony or other acidic gums. The glycerol may be replaced by an equivalent quantity of any other polyhydric alcohol such as polyglycerol, ethylene glycol, diethylene glycol, triethylene glycol, and the like. Furthermore any other dibasic acid possessing six or more carbon atoms linked together in a normal straight chain, such as adipic acid, pimelic acid, suberic acid, or azelaic acid or any mixture of these acids, may be used in whole or in part to replace the sebacic acid.

From the description hereinabove set forth, it will be understood by those skilled in the art that the principles of my invention are neither limited to the specific proportions indicated nor to the specific temperatures recommended, but that wide and numerous modifications of the above procedure are possible without departing from its scope. For instance, the normal ester of the acidic gum and the glycerol or other polyhydric alcohol, may first be prepared and subsequently heated with the dibasic acid containing a minimum of six carbon atoms linked together in a straight chain. Or the glycerol may first be heated with the dibasic acid containing six or more carbon atoms in a straight chain, and subsequently esterified further with the acidic gum. The esterification may be carried out either in vacuum or at atmospheric pressure, and condensing agents such as hydrochloric acid or alkaline earth oxides may be added if necessary.

I claim:

1. A composition of matter comprising a mixed ester of an acidic gum with a polyhydric alcohol and a straight chain aliphatic acid of the formula

$$\text{HOOC}-(\text{CH}_2)_n-\text{COOH}$$

where $n$ is a whole number between 4 and 8 inclusive.

2. A composition of matter comprising a mixed ester of colophony with a polyhydric alcohol and a straight chain aliphatic acid of the formula $\text{HOOC}-(\text{CH}_2)_n-\text{COOH}$ where $n$ is a whole number between 4 and 8 inclusive.

3. A composition of matter comprising a mixed ester of an acidic gum with glycerol and a straight chain aliphatic acid of the formula $\text{HOOC}-(\text{CH}_2)_n-\text{COOH}$ where $n$ is a whole number between 4 and 8 inclusive.

4. A composition of matter comprising a mixed ester of colophony with glycerol and a straight chain aliphatic acid of the formula HOOC—$(CH_2)_n$—COOH where $n$ is a whole number between 4 and 8 inclusive.

5. A composition of matter comprising a mixed ester of an acidic gum, a polyhydric alcohol and sebacic acid.

6. A composition of matter comprising a mixed ester of colophony, a polyhydric alcohol, and sebacic acid.

7. A composition of matter comprising a mixed ester of an acidic gum, glycerol, and sebacic acid.

8. A composition of matter comprising a mixed ester of colophony, glycerol, and sebacic acid.

9. A composition of matter comprising a mixed ester of an acidic gum, a polyhydric alcohol and adipic acid.

10. A composition of matter comprising a mixed ester of an acidic gum, glycerol, and adipic acid.

11. A composition of matter comprising a mixed ester of colophony, glycerol and adipic acid.

12. A composition of matter comprising a mixed ester of an acidic gum, diethylene glycol, and a straight chain aliphatic acid of the formula HOOC—$(CH_2)_n$—COOH where $n$ is a whole number between 4 and 8 inclusive.

13. A composition of matter comprising a mixed ester of an acidic gum, diethylene glycol, and sebacic acid.

14. A composition of matter comprising a mixed ester of colophony, diethylene glycol, and sebacic acid.

15. The process of preparing a resin which comprises heating to reaction temperature an acidic gum, a polyhydric alcohol, and a straight chain aliphatic acid of the formula HOOC—$(CH_2)_n$—COOH where $n$ is a whole number between 4 and 8 inclusive.

16. The process of preparing a resin which comprises heating to reaction temperature colophony, glycerol, and sebacic acid.

17. The process of preparing a resin which comprises heating to reaction temperature colophony, a polyhydric alcohol and sebacic acid.

18. Process of preparing a resin which comprises heating to reaction temperature in the presence of condensing agents an acidic gum, a polyhydric alcohol, and a straight chain aliphatic acid of the formula HOOC—$(CH_2)_n$—COOH where $n$ is a whole number between 4 and 8 inclusive.

19. Process of preparing a resin which comprises heating to reaction temperature (1) the ester of an acidic gum and a polyhydric alcohol with (2) a straight chain aliphatic acid of the formula HOOC—$(CH_2)_n$—COOH where $n$ is a whole number between 4 and 8 inclusive.

20. Process of preparing a resin which comprises heating to reaction temperature (1) an acidic gum and (2) an ester of a polyhydric alcohol and a straight chain aliphatic acid of the formula HOOC—$(CH_2)_n$—COOH where $n$ is a whole number between 4 and 8 inclusive.

HERMAN ALEXANDER BRUSON.

DISCLAIMER 1,783,165.—*Herman Alexander Bruson*, Philadelphia, Pa. MIXED ESTERS OF COLOPHONY AND RELATED SUBSTANCES. Patent dated November 25, 1930. Disclaimer filed June 19, 1934, by the patentee, the assignee, *The Resinous Products & Chemical Company*, approving.

Hereby enters disclaimer to the following parts of the claims, to wit:

1. The subject matter covered by claims 1, 2, 3, 4, 12, 15, and 18, except where "$n$" is a whole number between 5 and 8, inclusive.

2. The subject matter covered by claims 9, 10 and 11.

[*Official Gazette July 10, 1934.*]

DISCLAIMER 1,783,165.—*Herman Alexander Bruson*, Philadelphia, Pa. MIXED ESTERS OF COLOPHONY AND RELATED SUBSTANCES. Patent dated November 25, 1930. Disclaimer filed October 18, 1934, by the patentee, and the assignee, *The Resinous Products & Chemical Company*, approving.

Hereby enters disclaimer to the following parts of the specification and claims, namely:

1. Claims 12, 13, 14.
2. Claims 1, 2, 5, 6, 15, 17 except when read to exclude dihydric alcohols.
3. The process of claim 18 except when sebacic acid is employed.

[*Official Gazette November 13, 1934.*]